United States Patent Office 3,259,516
Patented July 5, 1966

3,259,516
METHOD OF THERMALLY INSULATING ARTICLES WITH A FILLED POLYURETHANE COMPOSITION
Jay R. Dempsey and Joaquin V. Borsellino, Levittown, Pa., assignors to Thiokol Chemical Corporation, Bristol, Pa.
No Drawing. Filed May 25, 1960, Ser. No. 31,557
10 Claims. (Cl. 117—46)

This invention relates to a method of thermally insulating articles against heat and flame with a filled polyurethane composition.

In some phases of the rocketry arts, it is desirable to have an insulating composition with low thermal conductivity, high resistance to erosion by hot gases, and resistance to flame temperatures of from 3000° F. to 10,000° F. for short periods of time. For example, in the firing of so-called "captive" rockets, a rocket is often ground-tested by anchoring it firmly in a subterranean depression and firing it. During firing, the performance characteristics of the rocket are measured with various test instruments. During such tests, electrical leads from the test instruments to various components of the rocket are exposed to flames, high temperatures, and hot gases given off by the rocket. Unless successfully insulated, these leads are rapidly deteriorated during the test and may misfunction. In addition, within the rocket itself, certain components require insulation from flames and high temperatures generated during firing.

Although numerous insulating compositions are known in the prior art, the use of such compositions as insulators in the situation described is discouraged by the failure of these compositions to incorporate some or all of the properties desirable in such an insulation.

According to the present invention, an insulating polyurethane composition overcoming the defects observed in prior art insulating compositions has been discovered. The compositions of the invention can be prepared with a wide range of physical properties; the compositions vary from soft and flexible products to hard and rigid materials, all of which have an excellent resistance to impact and to thermal shock, and show excellent insulating properties. The novel compositions, in contrast to materials in the prior art, permit great flexibility in their mode of application. For example, the compositions may be troweled into place, sprayed on to a surface to be insulated, compression molded, or premolded and bonded in place with additional quantities of the insulation as a cement. The convenient workability of the compositions permits defects in castings to be repaired with fresh uncured material which can be troweled into the defect and cured in situ. Similarly, thin spots or worn spots in insulation coatings of this type may be easily repaired by fresh applications of new material.

None of the materials of the prior art show such great flexibility in their properties and ease of application. Phenolic materials, which have generally been used as insulation in the prior art, have insulating properties inferior to those of the polyurethane compositions herein disclosed. Further, phenolic materials usually require curing under such conditions as make in situ application or repair by application of fresh material impractical. Phenolic resins generally show poor adhesion to each other, may shrink excessively on curing, and may corrode conventional rocket housings. Thus, most phenolics require the formation of premolded insulating members which must later be fitted to the particular structure to be insulated. Prior art materials further are often rigid and unyielding, and lack the properties of flexibility which can be incorporated into the new compositions. The relatively low curing temperatures which can be used in curing a polyurethane composition permit the use of these insulators in jobs requiring "on the spot" application which would not be possible with prior art substances.

In view of the belief of those skilled in the art that polyurethane materials are not flame or heat resistant, the applicants believe to have discovered as a surprising result that compositions of this type when combined with a filler possess insulating properties often superior to those of resinous insulating compositions heretofore used in the art.

Although the insulating compositions of the invention may be prepared using several techniques, the best results are obtained using a prepolymer system. Such a system involves a prepared prepolymer, preferably a liquid urethane prepolymer having reactive isocyanate terminals. At the time of application, the prepolymer, admixed with an inorganic filler, is cured by addition of a curing agent and, where necessary, the application of heat.

The liquid urethane prepolymers of the type preferred for use in the present invention are prepared by the condensation of an organic polyisocyanate, either aliphatic or aromatic, but preferably an aromatic diisocyanate, with a polyhydric alcohol. An excess of isocyanate groups over hydroxyl groups in the reaction mixture assures that the resulting prepolymer has reactive isocyanate terminals. Although numerous aliphatic and aromatic alcohols can be reacted in the preparation of the liquid urethane prepolymer as known in the art, a preferred material is castor oil. Castor oil, well known to the art, is the oil expressed from the castor bean, and is a pale yellow transparent liquid generally having a density at 25° C. of about 0.945–0.965. The material contains a number of hydroxy groups which react with isocyanate to form the liquid urethane prepolymer.

Another polyhydric substance which has proved advantageous for use in the preparation of prepolymers for polyurethane compositions of the type described is a polyhydric polyester polymer produced by condensation of a polycarboxylic acid with one or more polyhydric alcohols. For example, the polyester prepared by the condensation of adipic acid, ethylene glycol, and propylene glycol, which polyester has unreacted hydroxy groups capable of further reaction with isocyanate, has particularly good properties.

The preparation of liquid urethane prepolymers of the kind described above is shown by way of illustration in Examples 1, 2, and 3 below.

*Example 1*

A glass lined reactor was charged with 77 ml. of toluene diisocyanate and heated to a temperature of 85° F. Castor oil was fed into the reactor slowly over a 70 minute period in an amount such that the mixture in the reactor contained about 2.5 isocyanate groups to each hydroxyl group present in the polyhydric castor oil. During this addition, the temperature of the reactor was permitted to increase to about 130° F. and, after addition was completed, the reactor was heated to 185° F. over a period of 30 minutes. It was then kept at this temperature for an additional hour. The contents of the reactor were then cooled as rapidly as possible to 100° F. A liquid urethane prepolymer having an isocyanate analysis between about 10.4 percent and 10.8 percent resulted.

*Example 2*

A condensation polymer having reactive hydroxyl groups was prepared by charging a reactor with adipic acid, ethylene glycol, and propylene glycol, in the mole ratios 4.5:3.5:1.5. The temperature of the reaction mixture was gradually raised to a temperature of 425° F. until an acid number of three or less was reached. The polyester was then discharged from the reactor.

A urethane prepolymer was prepared from the above polyester by heating the polyester to approximately 212° F. and adding toluene diisocyanate to the molten polymer. The amount of toluene diisocyanate used was such as to give approximately two and one-half isocyanate groups for each free hydroxyl group of the polyester. The total mixture was maintained at 212° F. for approximately one hour and then discharged from the reactor.

*Example 3*

A condensation polymer having reactive hydroxy groups was prepared by reacting adipic acid, ethylene glycol, and propylene glycol, in the mole ratios 4.5:4.0:1.0 with removal of the water formed.

To form a liquid urethane prepolymer, the polyhydric polyester prepared above was treated with an amount of toluene diisocyanate, slowly added, such that approximately two isocyanate groups for each free hydroxyl group of the polyester were present in the reaction mixture. The mixture was then heated over several hours to a temperature above 212° F. until the isocyanate had reacted with the hydroxyl groups. A liquid urethane prepolymer resulted.

The insulating compositions of the invention are prepared from urethane prepolymers of the type described above by mixture of these prepolymers with a refractory filler and with a cross-linking agent for the prepolymer. In general, the best compositions contain between about 30 and 150 parts by weight of refractory filler, and between about 3 and 100 parts by weight of cross-linking agent for each 100 parts of prepolymer. Within this range of compositions, insulating materials having a wide variety of consistencies and properties can be prepared.

As refractory materials, numerous fibrous and granular inorganic materials can be employed. For example, both chrysolite and crocidolite, varieties of asbestos, have been employed as fillers. Abrasive grade silicon carbide and abrasive grade alumina have also been incorporated into the insulating compositions. Flint quartz, diatomaceous earth, ceramic fibers, glass fibers, and fibrous magnesium silicate talc have additionally been employed. It is possible to incorporate more than one kind of filler into an insulating composition to adapt it to particular purposes. The best properties are shown by those compositions containing fibrous refractory materials, preferably asbestos. Insulating compositions containing powdered refractory materials may erode in a stream of hot gases releasing spark showers of heated particles. The best results are given by those compositions containing crocidolite.

The curing agent used to cure the urethane prepolymers of the insulating composition are materials reactive with the isocyanate terminals of the urethane prepolymer. Thus, in general, they are materials having an active hydrogen atom capable of reacting with an isocyanate group. A preferred class of materials are polyhydric substances similar to those employed in the preparation of the prepolymer itself. The cure is often speeded by the presence of a basic substance like an organic amine. It is possible to use as a curing agent a substance containing not only a plurality of hydroxyl groups, but also basic amino groups within the same molecule. Cross-linking reagents which have been used with particular success in preparing the polyurethane insulating compositions of the invention are aliphatic polyhydric alcohols and amino-alcohols such as castor oil, ricinoleyl alcohol

—$CH_3(CH_2)_5CHOHCH_2CH=CH(CH_2)_7CH_2OH$— and triisopropanol amine. These materials are used alone, in combination with each other, or in combination with basic aromatic and aliphatic tertiary amino-hydroxy promoting materials such as 2,4,6-tri(dimethylaminomethyl) phenol and N,N,N',N'-tetrakis (2-hydroxypropyl) ethylene diamine. In general, the cross-linking agent chosen for use in a particular insulating composition affects such properties of the composition as hardness and flexibility, but does not significantly affect the insulating properties of the composition.

A variety of specific polyurethane insulating compositions of the type described are illustrated by the examples below.

*Example 4*

100 parts of the urethane prepolymer of Example 2 were mixed with 3 parts of triisopropanol amine and 30 parts of crocidolite asbestos. The asbestos is a silicate of sodium and iron having blue fibers which are rough and harsh, but very flexible. An approximate analysis of the asbestos is $SiO_2$: 50 percent; SeO: 28 percent; $Se_2C_3$: 28 percent; MgO: 3 percent; $NaO_2$: 8 percent; combined $H_2O$: 2 percent. The materials were mixed together until homogeneous and troweled into a 2 inch by 2 inch by ½ inch cavity in a steel mold. The sample was cured for ¾ hour to one hour in an oven at 300° F., while another sample was retained at room temperature for observation of sag and flow properties. The material was easily applied, showed no sag or flow either at room temperature or at the cure temperature. There was no resin bleeding or blistering. Adhesion of the cured material was good. After completion of the cure, the sample was removed from the mold and weighed. On exposure for 60 seconds to a neutral flame (about 5000°–6000° F.) from an oxyacetylene torch, a weight loss of 0.069 gram per second was observed. Thermocouples stationed on both sides of the ½ inch thick slab registered a temperature rise of 10° F. during the test. The material adhered well after burning. Portions exposed to the flame remained soft and spongy after removal of the flame.

*Example 5*

The variation in texture obtainable by varying the cross-linking agent used with a urethane prepolymer is illustrated by the four materials specifically described below.

A. An extremely hard insulating composition was prepared by mixing 100 parts by weight of the castor oil prepolymer described in Example 1 above with 15 parts of triisopropanol amine and 30 parts of Canadian chrysolite. The asbestos material is a hydrous magnesium silicate, light green to gray in color, having very fine, silky fibers with good flexibility. A typical analysis is MgO: 40 percent; $SiO_2$: 38 percent; combined $H_2O$: 12 percent. The material had good trowelability with no sag or flow at room temperature. The material was cured for one hour at 300° F. without bleeding or blistering and with only slight flow. On 60 second exposure to an oxyacetylene torch, the weight loss averaged 0.032 gram per second.

B. A hard insulating composition was prepared by mixing 100 parts of the castor oil prepolymer of Example 1 with 14.7 parts of castor oil, 11.8 parts of triisopropanol amine, and 80 parts of Canadian chrysolite. The material had excellent trowelability and showed no sag or flow at either room temperature or cure temperature. The composition was cured in one hour at 300° F. without blistering or bleeding. On exposure to an oxyacetylene torch for 60 seconds, the weight loss averaged 0.025 gram per second.

C. A polyurethane insulating composition of medium hardness and flexibility was prepared by mixing 100 parts of the prepolymer of Example 1 with 33 parts by weight of ricinoleyl alcohol and 60 parts by weight of Canadian chrysolite. The material was easily applied and showed no sag or flow at room temperature. On curing for 1 hour at 300° F., a slight flow was observed. The cured product was free of bleeding or blistering, and on exposure to an oxyacetylene flame for 60 seconds, lost an average of 0.030 gram per second.

D. A soft flexible polyurethane insulating composition was prepared by mixing 100 parts by weight of the castor oil prepolymer of Example 1 with 73 parts of castor oil, 1 part of 2,4,6-tri(dimethylaminomethyl) phenol, and 88 parts of crocidolite. Good trowelability with absence of sag or flow was observed at room temperature. On curing for 45 minutes at 300° F., a product free of bleeding and blistering was obtained. Exposure to an oxyacetylene torch for 60 seconds caused an average weight loss of 0.0666 gram per second. Thermocouples placed on opposite sides of the sample during application of the torch showed a rise of 22° F. during the course of the test.

*Example 6*

A number of samples comprising the same prepolymers and cross-linking agents, but differing in their content of refractory filler, was prepared. In each case, the compositions contained 100 parts by weight of the castor oil prepolymer of Example 1 above, compounded with 14.7 parts of castor oil and 11.8 parts of triisopropanol amine. In one case, 120 parts by weight of 100 mesh alumina were mixed in. After curing for 45 minutes at 300° F., a sample was exposed to an oxyacetylene torch for 60 seconds and showed an average weight loss of 0.062 gram per second and a temperature rise, measured across the sample during heating, of 13° F. A second sample identically prepared and cured except for containing 80 parts by weight of glass fibers and 16 parts by weight of aluminum silicate showed an average weight loss of 0.055 gram per second and a temperature rise of 19° F. on exposure to a flame. Other samples were prepared mixing 40 parts by weight of crocidolite with 20 parts by weight of finely divided quartz as a refractory material.

*Example 7*

A flexible polyurethane insulating composition, indicated below in the table as sample A, was prepared from 100 parts of the prepolymer of Example 1, 73 parts of castor oil, 1 part of 2,4,6-tri(dimethylaminomethyl) phenol, and 50 parts of crocidolite. The sample was molded and cured into a slab of the thickness shown in the table. A second semi-rigid polyurethane composition (sample B) comprising 100 parts of the prepolymer of Example 1, 14.7 parts of castor oil, 11.8 parts of triisopropanol amine, and 50 parts of crocidolite was formed into a slab of the thickness indicated in the table below. Three slabs of rigid phenolic materials commercially available from the Fiberite Corporation and characterized by their manufacturer as "Fiberite 1344," "Fiberite 40–3190," and "Fiberite 1370" were similarly prepared in a comparable thickness. The materials are available commercially as granules which are compression molded into a desired shape. All five samples were then exposed to a burn-through test using the neutral flame of an oxyacetylene torch. Temperature rise, burn-through time, and temperature at burn-through were measured. The results are collated in the following table.

| Sample | Character | Resin type | Thickness (in.) | Temp. Rise in 60 sec. (° F.) | Burn-through Time (sec.) | Temp. at Burn-through (° F.) |
|---|---|---|---|---|---|---|
| A | Flexible | Urethane | 0.305 | 11 | 145 | 111 |
| B | Semi-rigid | do | 0.373 | 4 | 190 | 151 |
| 1344 | Rigid | Phenolic | 0.393 | 34 | 150 | 293 |
| 40–3190 | do | do | 0.350 | 95 | 125 | 750 |
| 1370 | do | do | 0.383 | 308 | 330 | 1,300 |

Spalling and cracking of the phenolic compositions was very apparent during the test. The polyurethane material showed complete resistance to such defects. The rigid commercial materials used for purposes of comparison are also approximately 40 percent heavier than the polyurethane compositions showing superior properties.

Although specific examples have been shown and described, it is to be understood they are illustrative, and are not to be construed as limiting on the scope and spirit of the invention.

What is claimed is:
1. The method of thermally insulating an article against the direct application of heat and flame at temperatures of at least 3000° F. which comprises (1) applying to said article a curable insulating composition consisting essentially of 30–150 parts by weight of a refractory filler, about 5–100 parts by weight of a cross-linking agent selected from the group consisting of polyhydric alcohols and polyhydric amino-alcohols, and 100 parts by weight of a polyurethane polymer having reactive terminals, said polyurethane polymer being the reaction product of an excess of an organic polyisocyanate and a member selected from the group consisting of polyhydric alcohols and polyester polymers of a polycarboxylic acid and a polyhydric alcohol, (2) curing the composition in situ, and (3) directly exposing said insulated article to heat and flame at temperatures of at least 3000° F.

2. The method as in claim 1 wherein said cross-linking agent is a polyhydric alcohol.

3. The method as in claim 1 wherein said cross-linking agent is a polyhydric amino-alcohol.

4. The method of thermally insulating an article against the direct application of heat and flame at temperatures of at least 3000° F. which comprises (1) applying to said article a body of a composition consisting essentially of 30–150 parts by weight of a refractory filler in a matrix of a cured polyurethane reaction product of an excess of an organic polyisocyanate and a member selected from the group consisting of polyhydric alcohols and polyester polymers of a polycarboxylic acid and a polyhydric alcohol, said polyurethane reaction product having isocyanato groups therein and being cured by reaction of the isocyanato groups in 100 parts by weight of said reaction product with about 5–100 parts by weight of a cross-linking agent selected from the group consisting of polyhydric alcohols and polyhydric amino alcohols, and (2) directly exposing said insulated article to heat and flame at temperatures of at least 3000° F.

5. The method as in claim 4 wherein said refractory filler is asbestos.

6. The method as in claim 4 wherein said polyurethane reaction product is formed between said polyisocyanate and a polyester polymer.

7. The method as in claim 4 wherein said polyurethane reaction product is formed between said polyisocyanate and castor oil.

8. The method of thermally insulating an article against the direct application of heat and flame at temperatures of at least 3000° F. which comprises (1) applying to said article a body of a composition consisting essentially of 30–150 parts by weight of asbestos in a matrix of a cured polyurethane reaction product of an excess of an organic polyisocyanate and a member selected from the group consisting of polyhydric alcohols and polyester polymers of a polycarboxylic acid and a polyhydric alcohol, said cured polyurethane reaction product comprising 100 parts of uncured polyurethane reaction product and 5–100 parts by weight of cross-linking agent, and (2) directly exposing said insulated article to heat and flame at temperatures of at least 3000° F.

9. The method as in claim 8 wherein said polyurethane reaction product is formed between said polyisocyanate and castor oil.

10. The method as in claim 8 wherein said polyurethane reaction product is formed between said polyisocyanate and a polyester polymer.

References Cited by the Examiner

UNITED STATES PATENTS

| 909,617 | 1/1909 | Laeufer et al. | 106—36 |
| 943,157 | 12/1909 | Norman | 106—36 |
| 1,980,227 | 11/1934 | Repony | 106—36 |
| 2,798,859 | 7/1957 | Bruce. | |

(Other references on following page)

UNITED STATES PATENTS

| | | |
|---|---|---|
| 2,888,413 | 5/1959 | Pace. |
| 2,902,388 | 9/1959 | Szukiewicz. |
| 2,921,916 | 1/1960 | Harrison et al. |
| 2,935,487 | 5/1960 | Fox et al. |
| 2,982,754 | 5/1961 | Sheffer et al. 117—232 |
| 2,983,702 | 5/1961 | Little et al. 260—75 |
| 3,022,190 | 2/1962 | Feldman 117—132 |

FOREIGN PATENTS

| | | |
|---|---|---|
| 783,615 | 9/1957 | Great Britain. |

RICHARD D. NEVIUS, *Primary Examiner.*

JOHN H. MACK, JOHN R. SPECK, A. LIEBERMAN, R. S. KENDALL, *Assistant Examiners.*